Figure 1:
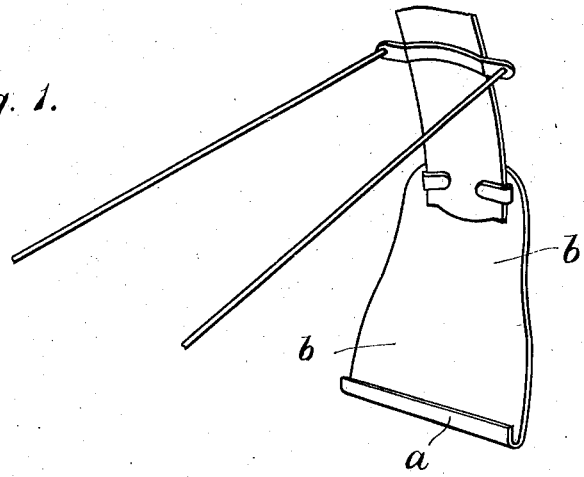

W. R. BIRT, Jr.
MUD GUARD FLAP FOR CYCLES, MOTOR CYCLES, AND VEHICLES.
APPLICATION FILED NOV. 3, 1911.

1,034,067.   Patented July 30, 1912.

WITNESSES

INVENTOR
WILLIAM RADCLIFF BIRT, JUNIOR
Attorney

UNITED STATES PATENT OFFICE.

WILLIAM RADCLIFF BIRT, JR., OF WYLDE GREEN, NEAR BIRMINGHAM, ENGLAND.

MUD-GUARD FLAP FOR CYCLES, MOTOR-CYCLES, AND VEHICLES.

1,034,067.   Specification of Letters Patent.   Patented July 30, 1912.

Application filed November 3, 1911. Serial No. 658,357.

*To all whom it may concern:*

Be it known that I, WILLIAM RADCLIFF BIRT, Jr., subject of the King of Great Britain, residing at West Lodge, Western Road, Wylde Green, near Birmingham, in the county of Warwick, England, have invented a new and useful Improvement in Mud-Guard Flaps for Cycles, Motor-Cycles, and Vehicles; and I do hereby declare the following to be a full, clear, and exact description of the same.

This invention consists in improvements relating to flaps for mounting on ordinary mudguards for cycles, motor cycles and vehicles. Such flaps are well known and are used for arresting the spray of mud which flies off the ordinary mudguards where the mud impinges on same. This spray occurs mainly near the lower part of the mudguard adjacent to the point of contact of the wheel with the road and is carried back by the wind on to the dress and boots of the rider. These flaps are found very effective in arresting this mud spray but it is found in practice that the mud and liquid collected on the flap drip off at the lower edge and are blown up on to the rider.

My invention is more particularly intended for mudguard flaps for cycles and motor cycles, but may quite readily be applied to such flaps of motor vehicles to prevent mud dripping off where it will splash up again or blow on to the vehicle.

In mudguards themselves means have been proposed for conveying mud thrown on to the guards to their lower ends such as by longitudinal grooves or beads, but as the liquid mud drips off the bottom edge it is blown up or splashed up on to the boots and garments of the rider. It has also been proposed to form a slotted mudguard which admits air for cooling a motor, with downwardly inclined corrugations for directing the mud away from the slot and toward the outer edges of the guard. In another case it has been proposed to employ in conjunction with a mudguard or awning, a plate arranged against the seat pillar stays with a ledge across it to drain clear of the tire any mud which remains on the wheel until the zenith of the revolution is reached. This plate was proposed so as to close the front end of the back mudguard and avoid the use of the portion of ordinary guards which incloses the front part of the rear wheel.

In accordance with my invention I form or provide mudguard flaps, which are used in conjunction with ordinary mudguards, with a gutter which is semicircular or other suitable shape in cross section and which is arranged and disposed so as to collect the mud thrown into the flap and direct it to one side or both of the flap so that it will not be blown on to the rider.

The gutter may be separately formed and secured by any suitable means to the flap and the device may then take the form of a trough or channel of thin metal or of any other suitable material and this is preferably arranged at an incline or curve from one side to the other, one end of the channel being lower than the other so that liquid and mud collected in it will flow down to the one side of the flap and drop off there. The device may be secured by rivets, spring clips or by flexible clips or pieces of metal or other suitable material for bending over the edges of the flap, or by any other suitable means. When in place on a flap the channel forms a stiffener for the flap as well as a conducting guide for the liquid and mud. When formed integral with the flap the bottom edge of the latter may be turned up to form a channel.

In either the case in which the guide is integral with the guard or flap, or the case in which it is separately formed and permanently or detachably secured thereto I may arrange it in the form of an angle so as to direct the liquid and mud to both sides, keeping the central portion of the bottom of the flap clear of the drippings so that the rider is protected. In either case I may provide the guide with an extension from the side or extensions from both sides of the flap so that it delivers well clear of the machine. Such extensions may be fixed or they may be slidable or otherwise removable. As an example I may employ a channel or other piece of metal or other suitable material sliding on the guide across the flap with coöperating stops to prevent its complete removal. When desired such a piece or extension can be readily slid out to project at the side and when not desired in such condition it may be pushed back on the main guide. A simple tongue spring or other means may be used for retaining such extensions in any desired position.

In place of slidable extensions hinged parts may be employed or detachable parts may be used. In some cases a piece of flexible material may be secured at the lower end of the gutter to convey the liquid to the ground and prevent splashing.

Figure 2:
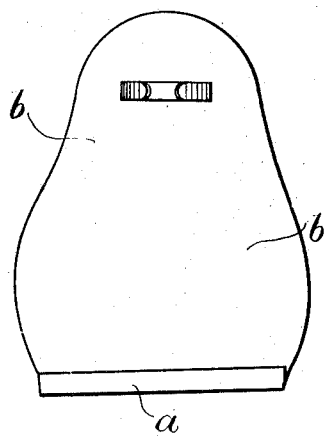
Figure 3:
Figure 5:
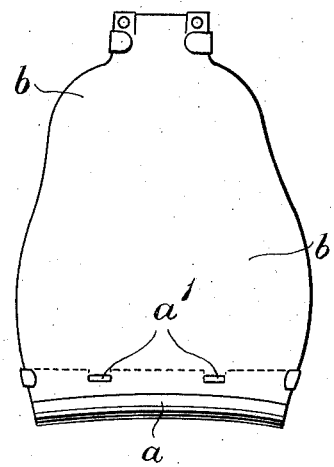
Figure 6:
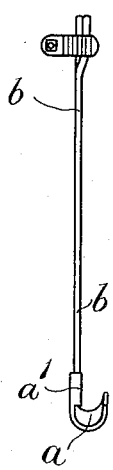
Figure 4:
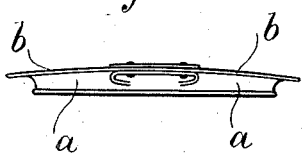

Referring to the drawings:—Figure 1 is a perspective view of my improved mud flap in position on the front wheel mudguard of a cycle. Fig. 2 is a front elevation of the mud flap. Fig. 3 is an end view of same. Fig. 4 is a plan. Fig. 5 is a modified form of my mud flap. Fig. 6 is a side view of same, while Fig. 7 is a plan.

In Figs. 1-4 the collecting and conveying means $a$ are in the form of a gutter integral with the flap $b$ and may be made of any suitable material such as metal or celluloid. It will be seen in Fig. 2 that the gutter $a$ is inclined so as to deliver the liquid mud or the like to one side.

Figure 7:
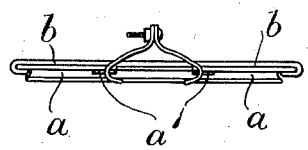

In Figs. 5-7 I have shown a modified form of my mud flap in which the collecting and conveying means $a$ are in the form of a gutter secured across at or near the bottom of the flap $b$. The gutter is formed as a simple trough shaped piece of metal and is secured by forming small tongues $a^1$ on the back piece which are passed through the flap and bent over. This form is a very effective and convenient one for flaps of leather or imitation leather and like material, but they may of course be made from leather or celluloid, although the latter material may readily be bent up to form the collecting and conveying means as heretofore described. It will be seen in Fig. 5 that the gutter $a$ inclines on either side from the center to deliver to each side.

What I claim then is:—

1. In a mudguard for cycles, motor cycles and other vehicles, the combination of an extension so positioned in relation to the wheel as to receive the mud thrown tangentially from same, and a gutter disposed at the base of said extension for collecting the mud.

2. In a mudguard for cycles, motor cycles and other vehicles, the combination of an extension so positioned in relation to the wheel as to receive the mud thrown tangentially from same, and an inclined gutter disposed at the base of said extension for collecting the mud and conveying it to the side of the vehicle.

3. In a mudguard for cycles, motor cycles, and other vehicles, the combination of an extension so positioned in relation to the wheel as to receive the mud thrown tangentially from same, and an inclined gutter disposed at the base of said extension and formed integral therewith by bending up the lower edge of the extension.

In testimony whereof, I have signed my name to this specification in the presence of two subscribing witnesses.

WILLIAM RADCLIFF BIRT, Junior.

Witnesses:
  HAROLD J. HONESTER,
  NORMAN S. BARLOW.